(12) United States Patent
Paulraj et al.

(10) Patent No.: US 11,682,399 B2
(45) Date of Patent: Jun. 20, 2023

(54) DYNAMIC REDFISH QUERY URI BINDING FROM CONTEXT ORIENTED INTERACTION

(71) Applicant: DELL PRODUCTS L.P., Round Rock, TX (US)

(72) Inventors: Deepaganesh Paulraj, Bangalore (IN); Rochak Gupta, Bangalore (IN); Chitrak Gupta, Bengaluru (IN); Nishi, Bihar (IN)

(73) Assignee: DELL PRODUCTS L.P., Round Rock, TX (US)

( * ) Notice: Subject to any disclaimer, the term of this patent is extended or adjusted under 35 U.S.C. 154(b) by 247 days.

(21) Appl. No.: 16/928,584

(22) Filed: Jul. 14, 2020

(65) Prior Publication Data

US 2022/0020377 A1    Jan. 20, 2022

(51) Int. Cl.
```
H04L 12/18    (2006.01)
G06F 21/31    (2013.01)
G06F 8/61     (2018.01)
G06F 16/955   (2019.01)
G10L 15/26    (2006.01)
G10L 15/30    (2013.01)
H04L 9/40     (2022.01)
H04L 67/55    (2022.01)
H04L 67/133   (2022.01)
```

(52) U.S. Cl.
CPC ............. *G10L 15/26* (2013.01); *G10L 15/30* (2013.01); *H04L 63/08* (2013.01); *H04L 67/133* (2022.05); *H04L 67/55* (2022.05)

(58) Field of Classification Search
CPC ....... G10L 15/26; G10L 15/30; H04L 67/133; H04L 67/55; H04L 63/08
See application file for complete search history.

(56) References Cited

U.S. PATENT DOCUMENTS

| | | |
|---|---|---|
| 9,218,301 B2 | 12/2015 | Gupta et al. |
| 9,372,814 B2 | 6/2016 | Gupta et al. |
| 9,489,320 B2 | 11/2016 | Gupta et al. |
| 9,671,992 B2 | 6/2017 | Gupta et al. |
| 9,749,960 B2 | 8/2017 | Gupta et al. |
| 9,906,604 B2 | 2/2018 | Gupta et al. |
| 9,961,157 B2 | 5/2018 | Gupta et al. |
| 9,998,464 B2 | 6/2018 | Gupta et al. |
| 10,038,655 B2 | 7/2018 | Paulraj |

(Continued)

*Primary Examiner* — Wing F Chan
*Assistant Examiner* — Billy H Ng
(74) *Attorney, Agent, or Firm* — Jackson Walker LLP; Christopher J. Rourk

(57) ABSTRACT

A system for data processing, comprising a first processor operating under algorithmic control and configured to receive audio data during a first session and to convert the audio data into encoded electrical data. A second processor operating under algorithmic control and configured to identify speech data in the encoded electrical data and to convert the speech data to text data. The second processor further configured to process the text data to identify one or more commands and one or more missing parameters of the commands. The second processor further configured to map context data to one or more commands and the one or more missing parameters and to select replacement parameter data corresponding to the missing parameter data from the mapped context data.

18 Claims, 2 Drawing Sheets

(56) References Cited

U.S. PATENT DOCUMENTS

| | | |
|---|---|---|
| 10,038,705 B2 | 7/2018 | Jreij et al. |
| 10,097,488 B2 | 10/2018 | Deepaganesh |
| 10,169,602 B2 | 1/2019 | Gupta et al. |
| 10,305,314 B2 | 5/2019 | Gupta et al. |
| 10,331,520 B2 | 6/2019 | Suryanarayana et al. |
| 10,355,861 B2 | 7/2019 | Basavarajaiah et al. |
| 10,270,298 B1 | 8/2019 | Gupta et al. |
| 10,430,351 B2 | 10/2019 | Gupta et al. |
| 10,565,169 B2 | 2/2020 | Gupta et al. |
| 10,628,496 B2 | 4/2020 | Babu et al. |
| 10,699,668 B1 | 6/2020 | Gupta et al. |
| 10,707,704 B2 | 7/2020 | Gupta et al. |
| 10,715,630 B2 | 7/2020 | Gupta et al. |
| 10,728,030 B2 | 7/2020 | Vishwanath et al. |
| 10,732,889 B2 | 8/2020 | Suryanarayana et al. |
| 10,761,838 B2 | 9/2020 | Roy et al. |
| 11,308,265 B1 * | 4/2022 | Cohen .................... G06F 3/167 |
| 2015/0311952 A1 * | 10/2015 | Varma .................... H04L 41/069 455/41.1 |
| 2016/0134723 A1 | 5/2016 | Gupta et al. |
| 2016/0234785 A1 | 8/2016 | Gupta et al. |
| 2017/0102952 A1 | 4/2017 | Khemani et al. |
| 2017/0104770 A1 | 4/2017 | Jreij et al. |
| 2017/0270001 A1 | 9/2017 | Suryanarayana et al. |
| 2017/0270060 A1 | 9/2017 | Gupta et al. |
| 2018/0041604 A1 * | 2/2018 | Poblete .................... H04L 67/561 |
| 2019/0122657 A1 * | 4/2019 | James .................... G06F 40/30 |
| 2019/0188373 A1 | 6/2019 | Gupta et al. |
| 2019/0392119 A1 | 12/2019 | Rahiman et al. |
| 2020/0133759 A1 | 4/2020 | Arzola et al. |
| 2020/0133805 A1 | 4/2020 | Bisa et al. |
| 2020/0133912 A1 | 4/2020 | Gupta et al. |
| 2020/0134192 A1 | 4/2020 | Gupta et al. |
| 2020/0257736 A1 | 8/2020 | Roy et al. |
| 2020/0258106 A1 | 8/2020 | Roy et al. |
| 2020/0272655 A1 | 8/2020 | Roy et al. |

* cited by examiner

DYNAMIC REDFISH QUERY URI BINDING FROM CONTEXT ORIENTED INTERACTION

TECHNICAL FIELD

The present disclosure relates generally to data processing, and more specifically to a system and method for dynamic Redfish query URI binding from context oriented interaction.

BACKGROUND OF THE INVENTION

Voice command systems allow a user to interact with a data processing system using voice commands, but are not readily able to provide a user with information about the expected parameters for the voice commands. As a result, complex commands are often unable to be implemented using voice commands.

SUMMARY OF THE INVENTION

A system for data processing is disclosed that includes a first processor that receives audio data during a first session and converts the audio data into encoded electrical data. A second processor identifies speech data in the encoded electrical data and converts the speech data to text data, processes the text data to identify one or more commands and one or more missing parameters of the commands, and maps context data to one or more commands and the one or more missing parameters, to select replacement parameter data corresponding to the missing parameter data from the mapped context data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
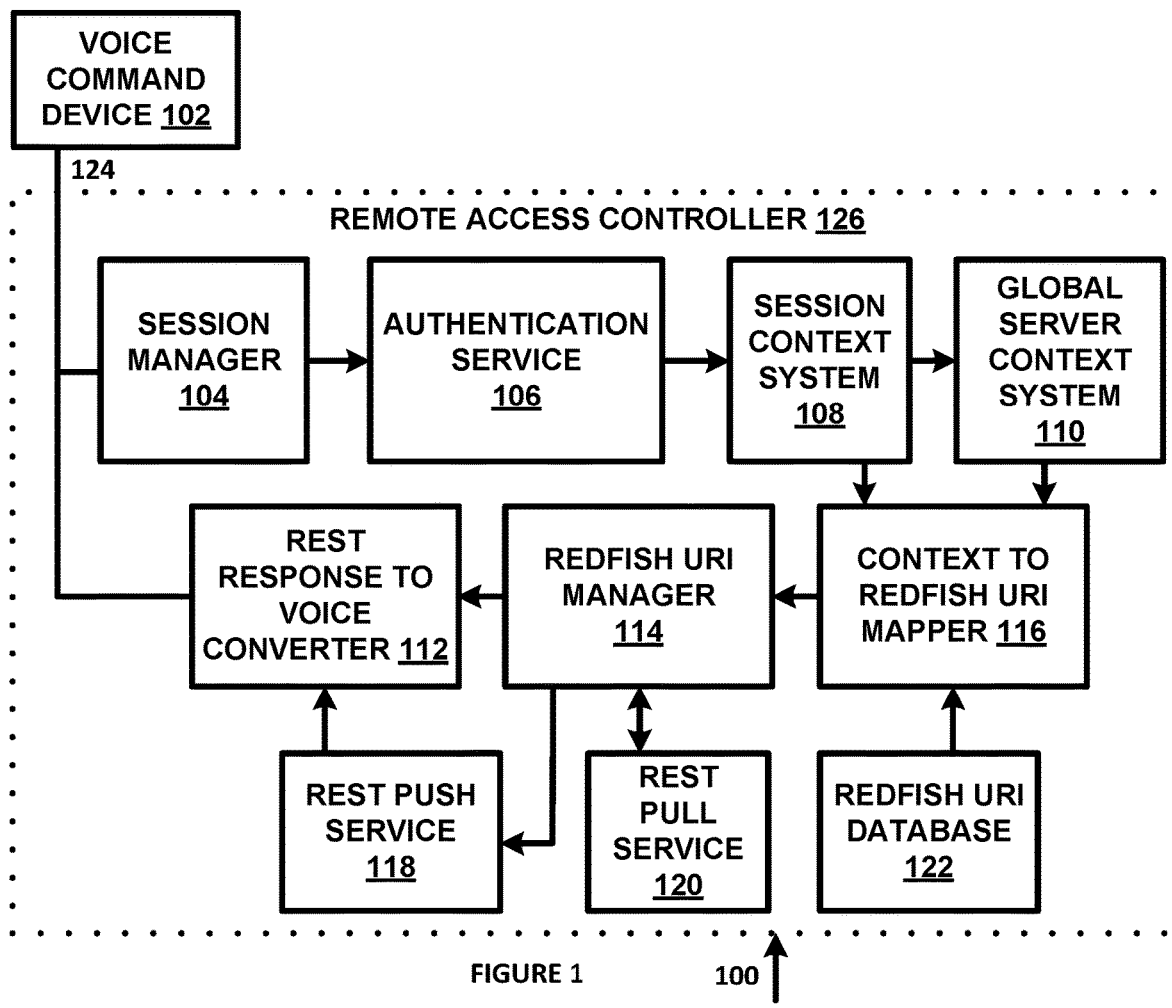
FIG. 1 is a diagram of a system for dynamic Redfish query URI binding from context-oriented interaction, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

An intelligent virtual assistant (IVA) or intelligent personal assistant (IPA) is a software agent that can perform tasks or services for an individual based on commands or questions. Some virtual assistants are able to interpret human speech and respond using synthesized voices. For example, the Redfish uniform resource identifier (URI) binding can be statically derived and mapped against such voice user interface commands. Once a session is established, the recursive interaction with context is not used to derive the Redfish URI binding dynamically. Examples of such voice commands and static generated Redfish URI is shown below:

| Voice Command | Static Generated Redfish URI |
|---|---|
| Power on the server X | /redfish/v1/Chassis/<Server X>/action/actions/PowerUp |
| How is the health of the server X | /redfish/v1/Chassis/<Server X>/HealthStatus |
| CPU health of server X | /redfish/v1/Chassis/<Server X>/HealthStatus/CPUHealthStatus |
| What is the Processor Name of the CPU 1 in server X | redfish/v1/Chassis/<Server X>/Processors/CPU1/ProcessorName |

In these existing methods, the user voice commands are processed and converted into English language statements. Natural language processing (NLP) can then optionally be applied, and content can be prepared that is statically matched with the associated Redfish URI. Since the voice to text conversion and NLP is processed for the given command in the below example, the server X is repeated in all the voice commands without which the mapping of Redfish URI cannot be completed.

The present disclosure provides a system and method to allow the user voice commands to be processed and converted into English language statements. Additionally, the session oriented context can be built over the series of voice commands. In this manner, session based content can be prepared dynamically, and an associated Redfish URI can be mapped using the Redfish Query parameters.

For example, in the previous method, the text server X is repeated in all the voice commands. But with the proposed system and method, the server X is derived from the session content and the Redfish URI can be formed dynamically, including any query parameters, such as select, filter, expand and so forth. Examples of the present disclosure are shown below, with changes indicated in underlining and bold:

| Interactive Voice Command | Context oriented Dynamic Generated URI |
|---|---|
| Power on the server X | /redfish/v1/Chassis/<Server X>/action/actions/PowerUp |
| How is the health ~~of server X~~ | /redfish/v1/Chassis/<Server X>/HealthStatus |
| CPU health ~~of server X~~ | /redfish/v1/Chassis/<Server X>/HealthStatus? $select = CPUHealthStatus |

| Interactive Voice Command | Context oriented Dynamic Generated URI |
|---|---|
| What is the Processor Name ~~of the CPU 1 in server X~~ | redfish/v1/Chassis/<Server X>/Processors/CPU? $select = ProcessorName |
| Show critical components | /redfish/v1/Chassis/<Server X>/HealthStatus? $filter = Status eq 'Critical' |

In these examples, the Redfish select parameter can be used to indicate to the implementation that it should return a subset of the properties of the resource based on the value of the select clause. The Redfish filter parameter can be used to indicate to the implementation that it should include a subset of the members of a collection based on the expression specified as the value of the filter clause.

In the present disclosure, a remote access controller, such as the Dell iDRAC remote access controller or other suitable remote access controllers, can be used to monitor incoming voice commands, to keep track of the sequence of commands and to build the context. When subsequent command instructions are not given with the required argument, the present disclosure can derive the appropriate argument from the context. Similarly, from the context semantic analysis, an appropriate Redfish query parameter can be chosen. Then, along with the derived arguments associated with query parameter, a dynamic Redfish URI can be framed to match the voice command. The dynamic Redfish URI can be given as a request to the Redfish daemon, and the JavaScript Object Notation (JSON) output response can be parsed and converted to a voice response using a text to voice converter, to allow a voice response to be passed to the user. The interaction and the context building continues and a more accurate Redfish URI can be formed.

Currently, there is no solution which provides a session context-oriented redfish URI mapping. In the present disclosure, Redfish query processing can be dynamically selected, as a function of session-based intent, and mapped based on the user interactions. For example, based on a user acknowledgement, a recursive Redfish URI query expansion can be performed to match the intention of the user.

The present disclosure includes a session manager module that can be implemented as one or more algorithmic instruction sets that are used to control a processor or other suitable logic devices that can be configured to manage a number of active sessions, such as a maximum number of allowed sessions. The session manager can also be used to manage the associated contexts for a session, such as the incoming IP address of a device, a geographical region associated with a device, device bandwidth, device history, recent commands received from a device, statistics about the past device usage and so forth.

The present disclosure can also include an intelligent authentication service module that can be implemented as one or more algorithmic instruction sets that are used to control a processor or other suitable logic devices to authenticate a user. The intelligent authentication service module can interact with an existing authentication service, such as a password based service, an OAUTH open standard for access delegation, by deriving an active child session or in other suitable manners. The intelligent authentication service module can present a user with multiple queries, such as personal, organizational, geographical, server hardware specific and so forth, and can registers the responses against the user. In another example embodiment, it can train a voice recognition module to assist with voice authentication. In yet another example embodiment, when a user requests information based on a configured level of criticality (such as a Redfish GET, or a Redfish—POST/PATCH to perform an action), the intelligent authentication module can select random questions and validate the user, such as by asking more questions for a POST URI than a GET URI or in other suitable manners. If a user response is suspicious against the answers, the intelligent authentication module can build dynamic questions like specific actions performed in the recent past (such as a date and time of a last login or a name of a virtual disk created), specific information about the server (such as a server location or a firmware version) or other suitable questions.

The present disclosure can also utilize an intelligent context to a Redfish URI mapper module that can be implemented as one or more algorithmic instruction sets that are used to control a processor or other suitable logic devices that are configured to dynamically generate a Redfish URI. This module can be configured to internally maintain a list of available Redfish URIs and a required number of arguments for the URI, such that whenever a user provides only partial information, it can invoke a context manager to provide session details, history, statistics of the user and the type, a nature of the required arguments and other suitable data, along with the provided partial information. The module can collect the top rated high ranked associated words from a context manager and map them according to the order of the arguments. Based on the context, this module can be configured to predicts a user intention and to build recursive Redfish URI query parameters ($SELECT, $FILTER, $EXPAND), to aid with obtaining an intended response.

The present disclosure can also utilize a Redfish URI Manager that can be implemented as one or more algorithmic instruction sets that are used to control a processor or other suitable logic devices that are configured to execute a URI query. This module can get a JSON response from a Redfish PULL service and pass the response to convert the text to voice and send it to the user. If the URI query is related to streaming of the data and notifications, then this module can register or subscribe the requested data from the PUSH service (Server Side Eventing) and can convert the JSON response to voice, to send the steam of data and notification to the user over the network.

FIG. 1 is a diagram of a system 100 for dynamic Redfish query URI binding from context-oriented interaction, in accordance with an example embodiment of the present disclosure. System 100 includes voice command device 102 which is connected over network 124 to remote access controller 126, which can include session manager 104, authentication service 106, session context 108, global server context 110, REST response to voice converter 112, Redfish URI manager 114, context to Redfish URI mapper 116, REST push service 118 REST pull service 120 and Redfish URI database 122, and can be implemented in hardware or a suitable combination of hardware and software.

Voice command device 102 can be implemented as one or more audio devices that can receive audio signals and process the audio signals to generate encoded electrical signals that represent the audio signals, one or more audio devices that can receive encoded electrical signals and generate audio signals, and one or more processors that operate under control of one or more algorithms that cause the processors to receive the encoded electrical signals and to transmit the encoded electrical signals over network 124 to session manager 104, and to receive encoded electrical signals from session manager 104 to process the received encoded electrical signals to generate audio signals. In different example embodiments, voice command device 102 can be implemented as a personal computer, a cellular telephone, a television set, a remote control for a television set, an artificial intelligence interactive system (e.g. a "chatbot"), an appliance or other suitable consumer devices.

Session manager 104 can be implemented as one or more algorithms that are loaded onto a processor and that are configured to cause the processor to manage a data communications session between voice command device 102 and authentication service 104, REST response to voice converter 112 and other suitable systems and components of system 100. In one example embodiment, session manager 104 can establish a data communications session with voice command device 102 over network 124, such as by exchanging Internet protocol messages and address data, to allow voice command device to interact with the other components of system 100, such as through a remote access controller such as the Dell iDRAC system available from Dell of Austin, Tex. or other suitable remote access controllers.

Authentication service 106 can be implemented as one or more algorithms that are loaded onto a processor and that are configured to cause the processor to authenticate voice command device, such as to ensure that data received from a third party is authentic and not from a hostile third party. In one example embodiment, authentication service 106 can be coupled to session manager 104 and session context 108 over a system data bus, one or more logical devices or in other suitable manners, as shown, as well as to other suitable systems and components. Authentication service 106 can interact with conventional authentication services, such as password-based or OAUTH services, and can determine required parameters for an active communications session. Authentication service 106 can also be configured to generate queries that can be used to determine personal identification of a user, organizational affiliations of a user, a geographical location of a user or device, server hardware specific data or other suitable data, and can register the responses against the user. Authentication service 106 can also implement training of a local or remote voice recognition module to assist with voice authentication, such as by generating data and controls that cause the voice recognition module to store voice profile data after a user has been authenticated by authentication service 106, to allow authentication service 106 to authenticate a user if they have previously been authenticated by authentication service 106 and have been recognized by a voice recognition module, or in other suitable manners.

In one example embodiment, a user instruction for information, such as a Redfish—GET command, or to perform an action, such as a Redfish POST or PATCH command, that is based on a configured level of criticality can cause authentication service 106 to validate or re-validate the user. In this example embodiment, authentication service 106 can ask generate more queries for a POST URI than for a GET URI, or other suitable authentication protocols can be implemented. If a user response is inconsistent with previous responses obtained from the user, authentication service 106 can generate additional dynamically-selected questions, such as queries based on specific actions performed in recent past (such as the last login date or time or the name of a virtual disk that was created), queries based on specific information about the server (such as a server physical location or a firmware version), or other suitable queries.

Session context 108 can be implemented as one or more algorithms that are loaded onto a processor and that are configured to cause the processor to generate logical association between text from different users, different sessions, different applications and so forth. In one example embodiment, session context 108 can be coupled to authentication service 106, global server context 110, context to Redfish URI mapper 116 and other suitable systems or devices over a system data bus, one or more logical devices or in other suitable manners, as shown, as well as to other suitable systems and components. In another example embodiment, a user can perform associated tasks during a session, can use text strings in association with those tasks with an associated frequency, and can otherwise generate text strings when interacting with system 100 that can be used to determine context associated with translated speech commands. Session context can also be configured to use context data generated in different domains to improve the uniformity of context that is derived from text strings. In one example embodiment, a task can be associated with specific types of equipment, and the text strings generated by users when interacting with system 100 to control that equipment can be used to generate logical associations within the text strings as well as with data associated with the equipment. As such, the following logical associations can be identified both within a domain or between unrelated domains, depending on the associated task, location, session, equipment and application:

One Level Examples text to text (e.g. a user first says "pause" then says "how are you," no action in response to second statement is determined from context).

text to task (e.g. a user first says "start compiling program A" then says "run," running program A is determined from context).

text to location (e.g. a user says "I am in the office" and then says "print," using a printer in the office is determined from context).

text to session (e.g. a user says "order pencils" and order is placed in session with equipment provider based on context).

text to equipment (e.g. a user says "turn up volume" and volume control for audio equipment is determined from context).

text to application (e.g. a user says "pause" while using dictation application and pausing the dictation application is determined from context).

Two Level Example text to text to task (e.g a user is working on program A and says "pause" then says "how are you," no action in response to second statement is determined from context, user then says "start compiling program A," compiling program A is determined from context).

Three Level Example text to text to task to location (e.g a user is working on program A and says "pause" then says "how are you," no action in response to second statement is determined from context, user then says "start compiling program A," compiling program A on local compiler is determined from context).

As can be seen, the logical relationships that can be identified can be based on a suitable combination of the different variables, such that system 100 can significantly improve the ability to determine context for verbal commands. In this manner, a user who is unfamiliar with a task, location, session, equipment, application or other aspect of system 100 can be queried to provide additional information where needed, or additional information can be determined from context, depending on the situation.

Global server context 110 can be implemented as one or more algorithms that are loaded onto a processor and that are configured to cause the processor to obtain context data from one or more different domains, where each domain contains context information having the same taxonomy as the context information of the current domain. In one example embodiment, global server context 110 can be coupled to session context 108, context to Redfish URI mapper 116 and other suitable systems or devices over a system data bus, one or more logical devices or in other suitable manners, as shown, as well as to other suitable systems and components. In another example embodiment, context data from different domains can be added to improve the ability of system 100 to determine context, where each domain can be selected to determine whether the added context data is effective. Context database versions can be used to roll back the context database to an earlier version, if a problem with the integration is detected.

REST response to voice converter 112 can be implemented as one or more algorithms that are loaded onto a processor and that are configured to cause the processor to generate a response to a voice converter using representational state transfer (REST). In one example embodiment, REST response to voice converter 112 can be coupled to session manager 104, Redfish URI manager 114, REST push service 118 and other suitable systems or devices over a system data bus, one or more logical devices or in other suitable manners, as shown, as well as to other suitable systems and components. REST response to voice converter 112 can use context data provided by system 100 in generating responses to voice converters.

Redfish URI manager 114 can be implemented as one or more algorithms that are loaded onto a processor and that are configured to cause the processor to interact with context to Redfish URI mapper 116 to generate Redfish uniform resource identifiers. In one example embodiment, Redfish URI manager 114 can be coupled to REST response to voice converter 112, context to Redfish URI mapper 116, REST push service 118, REST pull service 120 and other suitable systems or devices over a system data bus, one or more logical devices or in other suitable manners, as shown, as well as to other suitable systems and components.

Context to Redfish URI mapper 116 can be implemented as one or more algorithms that are loaded onto a processor and that are configured to cause the processor to dynamically generate a Redfish URI. In one example embodiment, context to Redfish URI mapper 116 can be coupled to Redfish URI manager 114, Redfish URI database 122, context session 108, global server context 110 and other suitable systems or devices over a system data bus, one or more logical devices or in other suitable manners, as shown, as well as to other suitable systems and components. Context to Redfish URI mapper 116 can be configured to internally maintain a list of available Redfish URIs and the required number of arguments for the URI. Whenever a user provides only partial information in a voice response, context to Redfish URI mapper 116 can be configured to provide session details, history, statistics of the user and the type, nature of the required arguments along with the given partial information. Context to Redfish URI mapper 116 can collect the top rated high ranked associated words and map them according to the order of the arguments. Based on the context, context to Redfish URI mapper 116 can be configured to select a most probable user intention and to build a recursive Redfish URI query parameter ($SELECT, $FILTER, $EXPAND) to confirm a probable user response or to otherwise get the intended response.

REST push service 118 can be implemented as one or more algorithms that are loaded onto a processor and that are configured to cause the processor to provide a representational state transfer push service to generate outgoing messages that are pushed to users, i.e. which are not generated in response to a user query. In one example embodiment, REST push service 118 can be coupled to Redfish URI manager 114, REST response to voice converter 112 and other suitable systems or devices over a system data bus, one or more logical devices or in other suitable manners, as shown, as well as to other suitable systems and components.

REST pull service 120 can be implemented as one or more algorithms that are loaded onto a processor and that are configured to cause the processor to provide a representational state transfer pull service to generate outgoing messages that are pulled to users, i.e. which are generated in response to a user query. In one example embodiment, REST pull service 120 can be coupled to Redfish URI manager 114 and other suitable systems or devices over a system data bus, one or more logical devices or in other suitable manners, as shown, as well as to other suitable systems and components.

Redfish URI database 122 can be implemented as one or more algorithms that are loaded onto a processor and that are configured to cause the processor to provide a Redfish URI dataset, such as to provide data in response to structured queries. In one example embodiment, Redfish URI database 122 can be coupled to context to Redfish URI mapper 116 and other suitable systems or devices over a system data bus, one or more logical devices or in other suitable manners, as shown, as well as to other suitable systems and components.

Network 124 can be implemented as a wireline network, a wireless network, an optical network, other suitable networks or a suitable combination of networks, to allow voice command device 102 to interact with other components of system 100.

Figure 2:
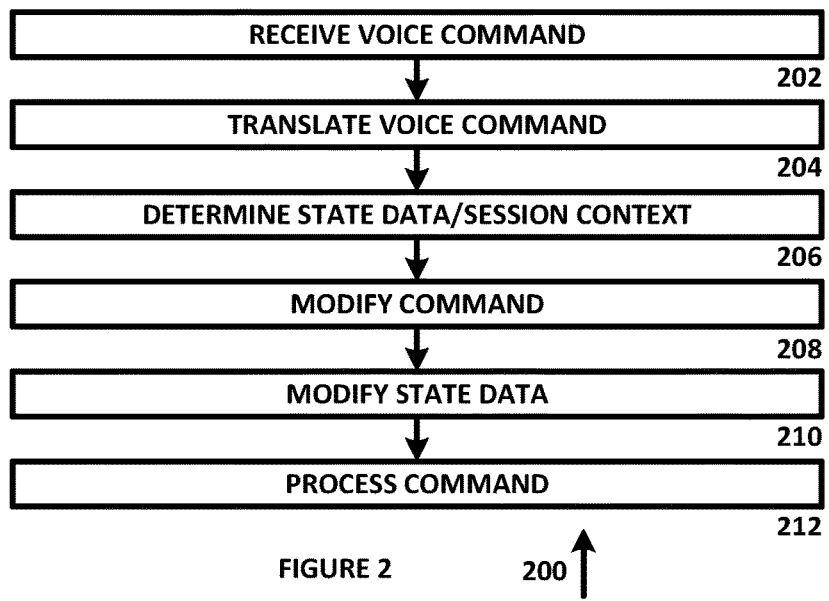
FIG. 2 is an algorithm for dynamic query binding from context-oriented interaction, in accordance with an example embodiment of the present disclosure.

FIG. 2 is an algorithm 200 for dynamic query binding from context-oriented interaction, in accordance with an example embodiment of the present disclosure. Algorithm 200 can be implemented in hardware or a suitable combination of hardware and software.

Algorithm 200 begins at 202, where a processor operates under algorithmic control to allow it to receive a voice command from a user. In one example embodiment, the voice command can be converted from an audio signal to a digital signal and processed to generate a text string, such as by using speech recognition processing at a voice command device, at a remote access controller or in other suitable manners. The algorithm then proceeds to 204.

At 204, a processor operates under algorithmic control to translate a voice command. In one example embodiment, the voice command can be translated using an authentication server to first authenticate the person providing the voice command, the system that has provided the voice command or in other suitable manners. The voice command can then be translated using a suitable protocol, such as a Redfish protocol or in other suitable manners. The algorithm then proceeds to 206.

At 206, a processor operates under algorithmic control to determine state data, session context and other suitable data associated with the voice command. In one example embodiment, the voice command can be incomplete and can require additional data pertaining to the state of the system, the session context of the command or other suitable data. The algorithm then proceeds to 208.

At 208, a processor operates under algorithmic control to modify the command based on the state data, the session data or other suitable data. In one example embodiment, the missing data associated with the voice command can be obtained using one or more additional algorithmic processes from a database of context data associated with system states, sessions, equipment, applications, geographic locations and so forth. The algorithm then proceeds to 210.

At 210, a processor operates under algorithmic control to modify state data associated with the voice command. In one example embodiment, the state data can be associated with the voice command, and can be used to modify the voice command to allow it to comply with a predetermined protocol, such as by completing any missing components of the command or in other suitable manners. The algorithm then proceeds to 212.

At 212, a processor operates under algorithmic control to process the command, such as after it has been suitable modified or in other suitable manners. In one example embodiment, the processor can generate additional text to speech data for transmission to the voice command device 102, as well as other suitable functions.

In operation, algorithm 200 provides for dynamic query binding from context-oriented interaction. Although algorithm 200 is shown as a flowchart, a person of skill in the art will recognize that object-oriented programming, state diagrams, ladder diagrams or other suitable logic structure or programming conventions can be used to implement algorithm 200.

Figure 3:
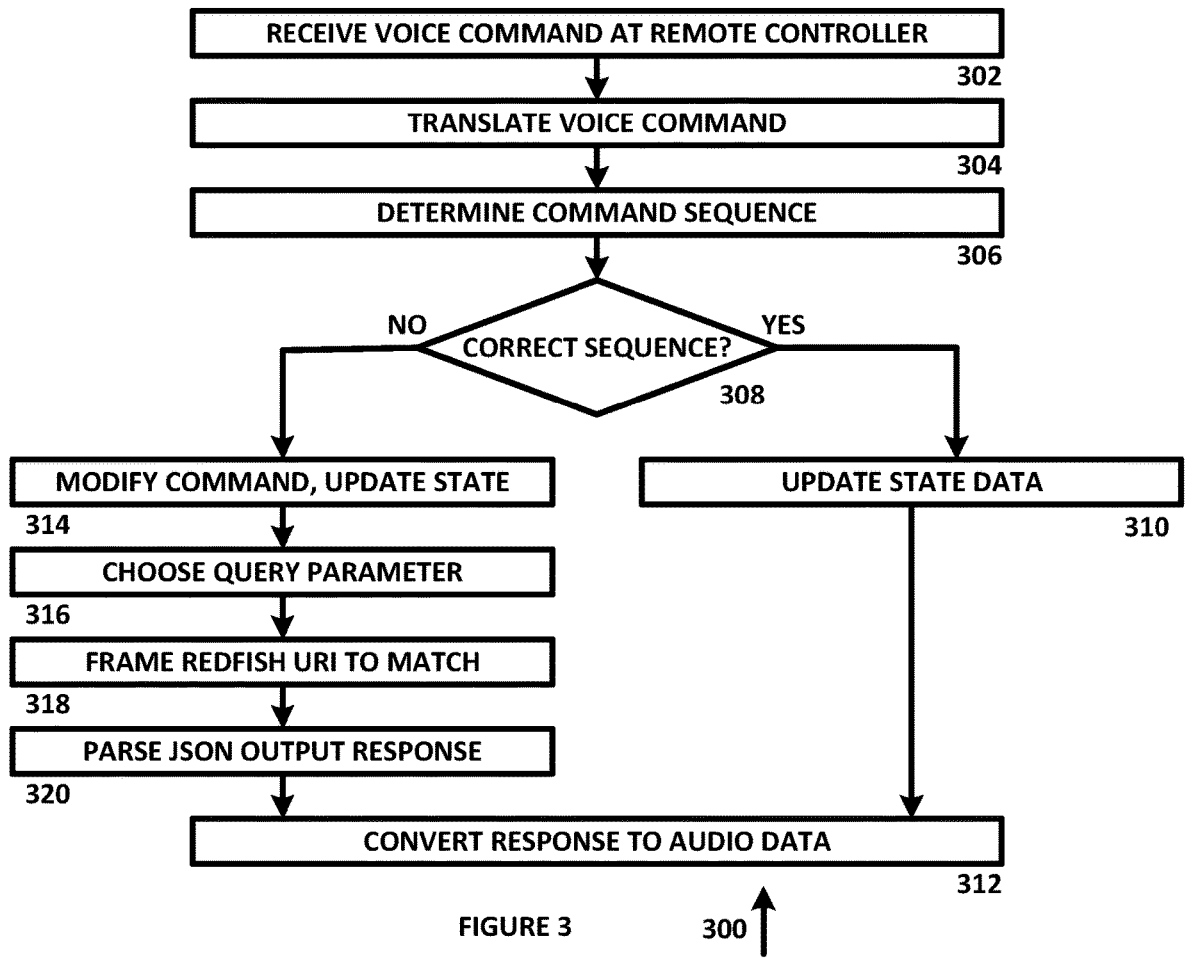
FIG. 3 is an algorithm for dynamic Redfish query URI binding from context-oriented interaction, in accordance with an example embodiment of the present disclosure.

FIG. 3 is an algorithm 300 for dynamic Redfish query URI binding from context-oriented interaction, in accordance with an example embodiment of the present disclosure. Algorithm 300 can be implemented in hardware or a suitable combination of hardware and software.

Algorithm 300 begins at 302, where a processor operates under algorithmic control to allow it to receive a voice command from a user at a remote controller. In one example embodiment, the voice command can be converted from an audio signal to a digital signal and processed to generate a text string, such as by using speech recognition processing at a voice command device, at a remote access controller or in other suitable manners. The voice command can then be transmitted to the remote controller over a network by the processor, such as by engaging in a session with the remote controller, by initiating the session with the voice command or in other suitable manners. The algorithm then proceeds to 304.

At 304, a processor operates under algorithmic control to translate a voice command. In one example embodiment, the voice command can be translated using an authentication server to first authenticate the person providing the voice command, the system that has provided the voice command or in other suitable manners. The voice command can then be translated using a suitable protocol, such as a Redfish protocol or in other suitable manners. The algorithm then proceeds to 306.

At 306, a processor operates under algorithmic control to determine a command sequence. In one example embodiment, the command sequence can be determined based on a command sequence protocol that is used by the processor, from state data stored in a data memory that is associated with the command sequence or in other suitable manners. The algorithm then proceeds to 308.

At 308, a processor operates under algorithmic control to determine whether the sequence is correct. If it is determined that the sequence is correct, the algorithm proceeds to 310, otherwise the algorithm proceeds to 314.

At 310, a processor operates under algorithmic control to modify state data associated with the voice command. In one example embodiment, the state data can be associated with the voice command, and can be used to modify the voice command to allow it to comply with a predetermined protocol, such as by completing any missing components of the command or in other suitable manners. The algorithm then proceeds to 312.

At 312, a processor operates under algorithmic control to convert a response to audio data. In one example embodiment, the conversion to audio data can be performed at a remote access controller, at a voice command device or in other suitable manners.

At 314, a processor operates under algorithmic control to modify the command based on the state data, the session data or other suitable data. In one example embodiment, the missing data associated with the voice command can be obtained using one or more additional algorithmic processes from a database of context data associated with system states, sessions, equipment, applications, geographic locations and so forth. The algorithm then proceeds to 316.

At 316, a processor operates under algorithmic control to choose a query parameter. In one example embodiment, the query parameter can be selected to obtain additional data that is required to comply with a protocol, such as a Redfish URI or other suitable protocols. The algorithm then proceeds to 318.

At 318, a processor operates under algorithmic control to frame a Redfish URI to match the response to the query parameter. In one example embodiment, contextual data can be used to frame a Redfish URI to match the response to the query parameter, or other suitable processes can also or alternatively be used. The algorithm then proceeds to 320.

At 320, a processor operating under processor control parses a JavaScript output notation response. In one example embodiment, the JavaScript output notation response can include human-readable text that is used to provide an input to a text to speech converter, or other suitable processes can also or alternatively be used. The algorithm then proceeds to 312.

In operation, algorithm 300 provides for dynamic Redfish query URI binding from context-oriented interaction. Although algorithm 300 is shown as a flowchart, a person of skill in the art will recognize that object-oriented programming, state diagrams, ladder diagrams or other suitable logic structure or programming conventions can be used to implement algorithm 300.

Figure 4:
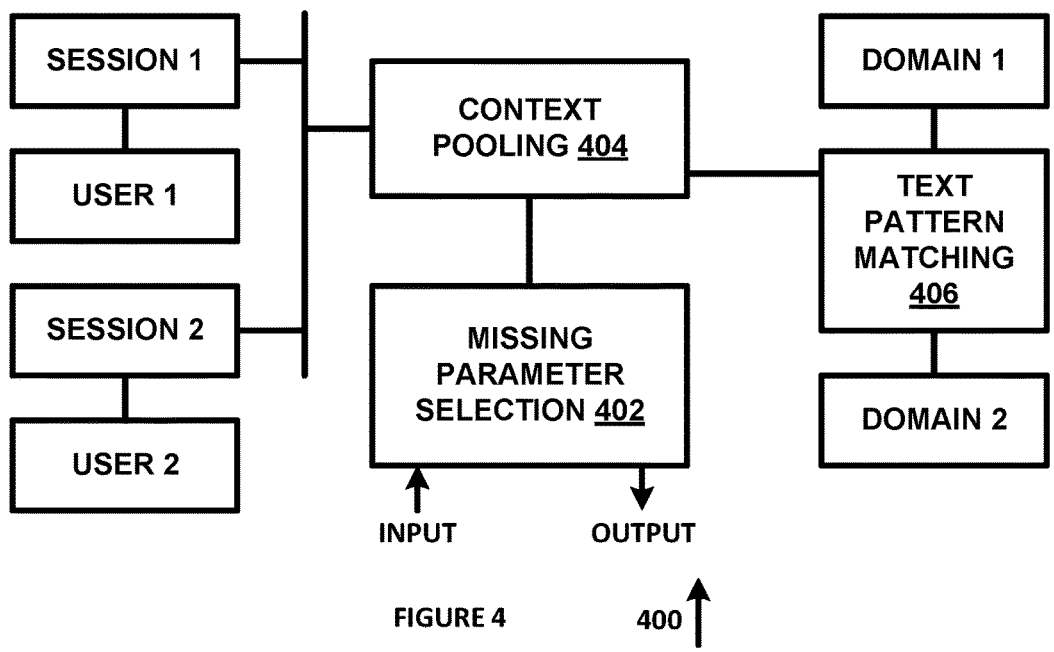
FIG. 4 is a diagram of a context pooling system, in accordance with an example embodiment of the present disclosure.

FIG. 4 is a diagram of a context pooling system 400, in accordance with an example embodiment of the present disclosure. Context pooling system 400 includes missing parameter selection 402, context pooling 404, session 1, user 1, session 2, user 2, domain 1, domain 2 and text pattern matching 406, each of which can be implemented in hardware or a suitable combination of hardware and software.

Missing parameter selection 402 can be implemented as one or more algorithms operating on a processor that cause the processor to identify a missing parameter associated with a voice command and to select data that completes the missing parameter. In one example embodiment, missing parameter 402 can use context pooling to select the data, or other suitable processes can also or alternatively be used.

Context pooling 404 can be implemented as one or more algorithms operating on a processor that cause the processor to obtain text and data from a plurality of sessions and a plurality of domains and pools the text and data to determine contextually relevant data to complete a voice command, consistent with a voice command protocol. In one example embodiment, context pooling 404 can obtain text and data having a predetermined taxonomy from two or more domains, and can combine that text and data to provide context pooling for selection of missing parameters for a voice command.

Session 1 and user 1, and session 2 and user 2 can each be a computer session having an associated user or other suitable functionality that can generate voice commands having one or more associated parameters. In one example embodiment, session 1 can include local and remote access systems that provide user 1 with voice command functionality, where user 1 can provide voice commands that do not include all relevant parameters. In order to complete the voice command, system 400 can utilize context pooling to determine the correct parameter, based on the parameter provided by other users for the same context in the same or other domains. Domain 1 and domain 2 can each include a plurality of sessions and associated users, where the sessions are used to provide voice commands that include one or more parameters that are provided by the users.

Text pattern matching 406 can be implemented as one or more algorithms operating on a processor that cause the processor to match text and data from different domains to facilitate pooling of context pooling. In one example embodiment, each domain can use a common taxonomy that allows the text pattern matching to be performed on relevant fields, or other suitable processes can also or alternatively be used.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing, comprising:
a first processor operating under algorithmic control and configured to receive audio data during a first session and to convert the audio data into encoded electrical data;
a second processor operating under algorithmic control and configured to identify speech data in the encoded electrical data and to convert the speech data to text data;
the second processor further configured to process the text data to identify one or more voice commands and one or more missing parameters of the identified one or more voice commands; and
the second processor further configured to map context data to the identified one or more voice commands and the one or more missing parameters of the identified one or more voice commands and to select replacement parameter data corresponding to the missing parameters from the mapped context data.

2. The system of claim 1 wherein the second processor comprises an authentication service configured to receive user data and to authenticate the user data, wherein the missing parameters are used to authenticate the user data.

3. The system of claim 1 wherein the second processor comprises a session context system configured to provide first session data to one or more predetermined fields of the mapped context data.

4. The system of claim 1 wherein the second processor comprises a global server context system configured to provide data from one or more second sessions to one or more predetermined fields of the mapped context data.

5. The system of claim 1 wherein the second processor comprises a context to Redfish URI mapper configured to assign the mapped context data in accordance with a Redfish protocol.

6. The system of claim 5 wherein the second processor comprises a Redfish URI manager configured to implement the Redfish protocol.

7. The system of claim 5 wherein the second processor comprises a Redfish URI database configured to provide Redfish URI data associated with the Redfish protocol.

8. The system of claim 1 wherein the second processor comprises a representational state transfer response to voice converter configured to provide response data to the identified one or more voice commands.

9. The system of claim 1 wherein the second processor comprises a representational state transfer push service configured to provide response data that is unassociated with the identified one or more voice commands.

10. A method for data processing, comprising:
receiving audio data at a first processor operating under algorithmic control during a first session; converting the audio data into encoded electrical data;
identifying speech data from the encoded electrical data at a second processor operating under algorithmic control;
converting the speech data to text data using the second processor;
processing the text data to identify one or more voice commands and one or more missing parameters of the identified one or more voice commands using the second processor;
mapping context data to the identified one or more voice commands and the one or more missing parameters of the identified one or more voice commands using the second processor; and
selecting replacement parameter data corresponding to the missing parameters from the mapped context data using the second processor.

11. The method of claim 10 further comprising:
receiving user data; and
authenticating the user data, wherein the missing parameters are used to authenticate the user data.

12. The method of claim 10 further comprising providing first session data to one or more predetermined fields of the mapped context data.

13. The method of claim 10 further comprising providing data from one or more second sessions to one or more predetermined fields of the mapped context data.

14. The method of claim 10 further comprising assigning the mapped context data in accordance with a Redfish protocol.

15. The method of claim 14 wherein a Redfish URI manager is configured to implement the Redfish protocol.

16. The method of claim 14 wherein a Redfish URI database is configured to provide Redfish URI data associated with the Redfish protocol.

17. The method of claim 10 further comprising providing response data to the identified one or more voice commands using a representational state transfer response.

18. The method of claim 10 further comprising providing response data that is unassociated with the identified one or more voice commands using a representational state transfer push service.

* * * * *